US012626205B2

(12) United States Patent
Mogoreanu et al.

(10) Patent No.: US 12,626,205 B2
(45) Date of Patent: May 12, 2026

(54) METHOD AND SYSTEM FOR SEMI-AUTOMATIC COMPLETION OF AN ENGINEERING PROJECT

(71) Applicant: Siemens Aktiengesellschaft, Munich (DE)

(72) Inventors: Serghei Mogoreanu, Munich (DE); Marcel Hildebrandt, Munich (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 429 days.

(21) Appl. No.: 17/840,701

(22) Filed: Jun. 15, 2022

(65) Prior Publication Data
US 2022/0414573 A1     Dec. 29, 2022

(30) Foreign Application Priority Data

Jun. 28, 2021     (EP) ..................................... 21182127

(51) Int. Cl.
| | |
|---|---|
| *G06Q 10/0631* | (2023.01) |
| *G06Q 10/0639* | (2023.01) |
| *G06Q 10/10* | (2023.01) |

(52) U.S. Cl.
CPC . *G06Q 10/06316* (2013.01); *G06Q 10/06393* (2013.01); *G06Q 10/103* (2013.01)

(58) Field of Classification Search
CPC ............. G06Q 10/06; G06Q 10/06316; G06Q 10/06393; G06Q 10/103
See application file for complete search history.

(56) References Cited

U.S. PATENT DOCUMENTS

| | | | | |
|---|---|---|---|---|
| 6,317,735 B1 * | 11/2001 | Morimoto | ............... | G06F 17/18 |
| | | | | 707/694 |
| 2007/0043611 A1 * | 2/2007 | Newman | ................ | G06Q 30/02 |
| | | | | 705/14.44 |

(Continued)

FOREIGN PATENT DOCUMENTS

| | | |
|---|---|---|
| CN | 112948608 A | 6/2021 |
| EP | 3751471 A1 | 12/2020 |

(Continued)

OTHER PUBLICATIONS

Hildebrandt, M. et al. (2019). A Recommender System for Complex Real-World Applications with Nonlinear Dependencies and Knowledge Graph Context. In: Hitzler, P., et al. The Semantic Web. ESWC 2019. Lecture Notes in Computer Science(), vol. 11503. Springer, Cham. https://doi.org/10.1007/978-3-030-21348-0_12.*

(Continued)

*Primary Examiner* — Timothy Padot
(74) *Attorney, Agent, or Firm* — Schreiser, Olsen & Watts LLP

(57)     ABSTRACT

An initial sequence representing a partially configured engineering project is processed by a recurrent neural network to generate recommendations being a sequence of complementary items that completes an engineering project. A feature predictor component computes a set of features for each recommendation. A bisection component selects a feature from the sets of features that distinguishes some of the recommendations and forms pruned recommendations by choosing all instances from the recommendations that have the selected feature. A user interface displays the selected feature, detects a user interaction indicating that the selected feature is required, outputs the pruned recommendations. The engineering project is completed by combining the initial sequence with the chosen pruned recommendation. As a result, a user is supported in choosing optimal modules, as (Continued)

the selected feature can distinguish the recommendations that have the desired technical properties or target system KPI.

10 Claims, 3 Drawing Sheets

(56)                    References Cited

U.S. PATENT DOCUMENTS

| | | | | |
|---|---|---|---|---|
| 2009/0204382 | A1* | 8/2009 | Tung | G06F 1/3203 |
| | | | | 703/21 |
| 2016/0239808 | A1* | 8/2016 | Ryu | G06Q 10/1093 |
| 2019/0121855 | A1* | 4/2019 | Alexander | G06F 16/248 |
| 2019/0155577 | A1* | 5/2019 | Prabha | G06Q 10/0635 |
| 2020/0073639 | A1* | 3/2020 | Prasad | G06F 8/10 |
| 2020/0279219 | A1* | 9/2020 | Desai | G06F 16/355 |
| 2021/0256434 | A1* | 8/2021 | Dubey | G06N 3/044 |
| 2022/0365756 | A1* | 11/2022 | Vasireddy | G06Q 10/101 |

FOREIGN PATENT DOCUMENTS

| | | | |
|---|---|---|---|
| EP | 3786851 | A1 | 3/2021 |
| WO | 2021037603 | A1 | 3/2021 |

OTHER PUBLICATIONS

J. W. Rozenblit and C. Kocourek, "Concepts for computer assisted engineering process management," Proceedings International Conference and Workshop on Engineering of Computer-Based Systems, Monterey, CA, USA, 1997, pp. 405-412.*

Stolz Alex et al: "Adaptive Faceted Search for Product Comparison on the Web of Data"; Computer Vision—ECCV 2020; 16th European Conference; Glasgow, UK, Aug. 23-28, 2020 : Proceedings; Lecture Notes in Computer Science; ISSN: 0302-9743; Springer International Publishing; pp. 120-429; XP047553240,; 2015.

Xi Niu et al: "Understanding Faceted Search from Data Science and Human Factor Perspectives"; ACM Transactions On Information Systems; Association for Computing Machinery, 2 Penn Plaza, Suite 701 New York NY 10121-0701; vol. 37; No. 2; pp. 1-27; XP058427796; ISSN: 1046-8188, DOI: 10.1145/3284101; Jan. 2019.

Wang Yue et al: "Attribute selection for product configurator design based on Gini index"; International Journal of Production Research.; vol. 52; No. 20; pp. 6136-6145; XP055906652; ISSN: 0020-7543; DOI: 10.1080/00207543.2014.917216; URL: https://www.tandfonline.com/doi/pdf/10.1080/00207543.2014.917216>; Apr. 14, 2014.

* cited by examiner

METHOD AND SYSTEM FOR SEMI-AUTOMATIC COMPLETION OF AN ENGINEERING PROJECT

CROSS-REFERENCE TO RELATED APPLICATIONS

This application claims priority to EP Application No. 21182127.7, having a filing date of Jun. 28, 2021, the entire contents of which are hereby incorporated by reference.

FIELD OF TECHNOLOGY

The following relates to a method and system for semi-automatically completing a complex engineering project, in particular an automation system.

BACKGROUND

Over the past two decades, advancements in industrial automation have transformed the factory floors and processes in a number of industries, ranging from process industries (e.g., Oil and Gas, Power and Utilities, Water and Wastewater) to hybrid industries (e.g., Food and Beverage, Wind) to discrete industries (e.g., Automotive Manufacturing, Aerospace, Robotics).

Automating processes in any of these industries requires engineers to design and configure an industrial automation solution—in other words to complete an engineering project for a complex system, consisting of a multitude of individual modules, the interplay of which fulfills the functional requirements arising from the intended application. Selection of necessary modules is typically done using configuration software offered by their manufacturer.

Other examples of engineering projects include printed circuit boards and autonomous vehicles. These systems, like the industrial automation solutions described above, can be complex and comprise a multitude of different modules. The configuration of the complex engineering projects may comprise an iterative process, in which a user incrementally selects modules (hardware and software components for building the engineering project). The combination of these selected modules can fulfill functional requirements of the engineering projects while being also compatible with one another. The configuration of a complex engineering process is not an easy task and requires time, effort, experience, and a certain amount of domain-specific knowledge to be completed correctly by a user.

WO 2021037603 A1 discloses a recommendation engine to automatically provide recommendations in order to support a user in the completion of an engineering project. The entire contents of that document are incorporated herein by reference.

SUMMARY

An aspect relates to provide a method and system that provide an alternative to the state of the art.

According to the method for semi-automatic completion of an engineering project, the following operations are performed by components, wherein the components are software components executed by one or more processors and/or hardware components:

calculating, by a first artificial intelligence component, latent representations of initial items of an initial sequence, with the initial sequence representing a partially configured engineering project, and with the initial items representing hardware modules and/or software modules used in the engineering project, and processing, by a second artificial intelligence component, the latent representations to generate recommendations, with each recommendation being a sequence of complementary items that completes the engineering project when combined with the initial sequence.

The method is characterized by the following operations that are performed by components, wherein the components are software components executed by one or more processors and/or hardware components:

computing, by a feature predictor component, a set of features for each recommendation, selecting, by a bisection component, a feature from the sets of features that distinguishes some of the recommendations, displaying, by a user interface, the selected feature, and detecting, by the user interface, a user interaction indicating that the selected feature is required, forming pruned recommendations by choosing all instances from the recommendations that have the selected feature, outputting, by the user interface, the pruned recommendations, and detecting, by the user interface, a user interaction choosing one of the pruned recommendations, automatically completing the engineering project by combining the initial sequence with the chosen pruned recommendation, and outputting and/or storing the completed engineering project.

The system for semi-automatic completion of an engineering project comprises the following components, wherein the components are software components executed by one or more processors and/or hardware components:

a first artificial intelligence component, adapted for calculating latent representations of initial items of an initial sequence, with the initial sequence representing a partially configured engineering project, and with the initial items representing hardware modules and/or software modules used in the engineering project, and a second artificial intelligence component, adapted for processing the latent representations to generate recommendations, with each recommendation being a sequence of complementary items that completes the engineering project when combined with the initial sequence.

The system is characterized by the following components, wherein the components are software components executed by one or more processors and/or hardware components:

a feature predictor component, adapted for computing a set of features for each recommendation, a bisection component, adapted for selecting a feature from the sets of features that distinguishes some of the recommendations and for forming pruned recommendations by choosing all instances from the recommendations that have the selected feature, a user interface, adapted for displaying the selected feature and detecting a user interaction indicating that the selected feature is required, outputting the pruned recommendations and detecting a user interaction choosing one of the pruned recommendations, and at least one hardware and/or software component, adapted for automatically completing the engineering project by combining the initial sequence with the chosen pruned recommendation, and outputting and/or storing the completed engineering project.

Latent representations calculated by the first artificial intelligence component can encode technical information about the modules of the engineering project. For example, the latent representation of each item can represent properties of the respective module as a vector.

The method and system, or at least some of their embodiments, can support an engineer in choosing optimal modules, given an intended application area, desired technical properties, and target system KPIs (key performance indicators), as the selected feature can distinguish the recommendations that have the desired technical properties or target system KPI.

Depending on the complexity of the engineering project and the skill of the user, the user may not be able to reach the same degree of optimization, or may not be able to complete the engineering project at all without the assistance of the method and system.

The method and system, or at least some of their embodiments, offer the additional flexibility of optimizing the choice of the modules according to a specific metric as represented by the selected feature. The solution space is advantageously pruned through at least one user interaction.

The method and system, or at least some of their embodiments, can offer an intuitive way of visualizing functionally conflicting recommendations that may be generated by the underlying machine learning model in certain situations.

Furthermore, the process of completing the engineering project can be performed by less experienced users with less domain-specific knowledge.

Moreover, the method and system, or at least some of their embodiments, provide an automated procedure to query user's preferences in an interactive manner. This mechanism allows to efficiently prune the solution space with regard to technical features of modules and enables user interaction.

The system, or at least some of its embodiments, is a data-driven system that can be used in the area of industrial engineering for optimizing the choice of modules according to a specific metric, while querying the user's preferences and adjusting the recommendations accordingly.

In contrast to existing data-driven approaches, the method and system, or at least some of their embodiments, query user's preferences, generate alternative suggestions, and take into consideration the sequential nature of the training data.

The method and system can be used for any kind of engineering project, in particular for different kinds of automated complex systems comprising a plurality of different modules, i. e. hardware and/or software modules. Each item can correspond to an associated hardware module such as a controller or to a software module such as an application program. Accordingly, the method and system can be used for a wide range of different engineering projects encompassing not only hardware modules but also software modules.

The method and system provide an automation mechanism for auto-completion of a partially configured engineering project.

In an embodiment of the method, the second artificial intelligence component has been trained to assign a plausibility score to each recommendation, indicating the plausibility of the respective sequence of complementary items. The pruned recommendations are sorted in the outputting operation according to their plausibility score on a display of the user interface.

In another embodiment of the method, the feature predictor component includes a rule-based system. In addition, or as an alternative, the feature predictor component includes at least one simulation module that computes at least some of the features. In addition, or as an alternative, at least some of the features are key performance indicators, in particular energy efficiency measures and/or performance measures.

In another embodiment of the method, the bisection component is adapted to select a feature that distinguishes approximately half of the recommendations, in particular by choosing a feature that maximizes a Gini index.

In another embodiment of the method, the second artificial intelligence component is implemented as a sequence-to-sequence model, in particular a recurrent neural network. The sequence-to-sequence model processes the input sequence.

This embodiment utilizes a recurrent neural network, which is a class of neural network architectures designed to exploit temporal nature of an input sequence, in this case the initial sequence representing the partially configured engineering project. For example, the recurrent neural network is fed with the initial sequence, wherein the initial items are represented by the latent representations calculated by the first artificial intelligence component, for example vectors.

In another embodiment of the method, the first artificial intelligence component and the second artificial intelligence component comprise artificial neural networks trained on technical properties of modules of the engineering system and a plurality of sequences of previously selected items.

For example, the first artificial intelligence component is trained on properties of items, and the second artificial intelligence component is trained on historical click-stream data of domain experts completing engineering projects. More generally, this embodiment leverages technical properties of the available modules and a collection of previously configured solutions.

As a result, this embodiment advantageously exploits historical data stemming from the configuration of previous engineering system. The historical data is used to train, in particular, the second artificial intelligence component. Based on training with historical examples of the order in which an engineer has been selecting modules of previous complex engineering projects, the second artificial intelligence component learns to predict entire sequences of items that complete the engineering project. Thanks to the data-driven nature of this embodiment, knowledge is transferred from more experienced engineers that have created the historical examples to the current user, who, as a consequence, requires less training. In other words, this embodiment goes beyond simply saving time for the user—it can enable a user to complete an engineering project even under circumstances where he would be incapable to do so on his own. In the case of very complex engineering projects, this may even be true for advanced users with a high degree of engineering experience: When provided with sufficiently rich contextual information and enough training examples, the second artificial intelligence component can discover substantially more complex dependencies among the modules than those that can be specified by a domain expert. Furthermore, performance of the system does improve with time based on the collected training data, as every completed engineering project can be used for additional training of the second artificial intelligence component.

The computer program is being executed by one or more processors of a computer system and performs the method.

The computer program product (non-transitory computer readable storage medium having instructions, which when executed by a processor, perform actions) has instructions executable by one or more processors of a computer system, wherein execution of the instructions causes the computer system to perform the method.

The computer-readable storage media have stored thereon instructions executable by one or more processors of a computer system, wherein execution of the instructions causes the computer system to perform the method.

BRIEF DESCRIPTION

Some of the embodiments will be described in detail, with reference to the following figures, wherein like designations denote like members, wherein.

DETAILED DESCRIPTION

In the following description, various aspects of embodiments of the present invention and embodiments thereof will be described. However, it will be understood by those skilled in the art that embodiments may be practiced with only some or all aspects thereof. For purposes of explanation, specific numbers and configurations are set forth in order to provide a thorough understanding. However, it will also be apparent to those skilled in the art that the embodiments may be practiced without these specific details.

The described components can each be hardware components or software components. For example, a software component can be a software module such as a software library; an individual procedure, subroutine or function; or, depending on the programming paradigm, any other portion of software code that implements the function of the software component. A combination of hardware components and software components can occur, in particular, if some of the effects according to embodiments of the invention are exclusively implemented by special hardware (e.g., a processor in the form of an ASIC or FPGA) and some other part by software.

In the following, the term "component" is used for the components that perform the method, while the term "module" is used for the modules that are constituting the engineering project. Despite the dedicated use of these terms, both terms are simply referring to the generic concept of a module/component.

Figure 1:
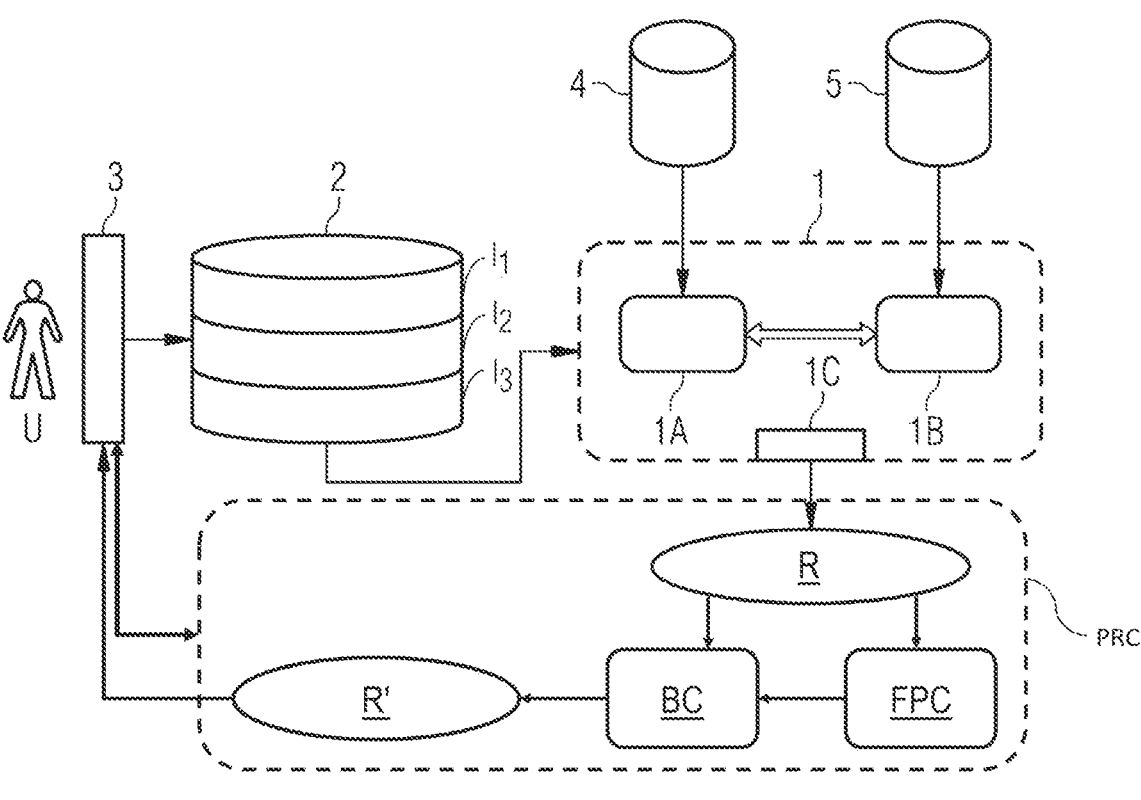
FIG. 1 shows a block diagram of a possible exemplary embodiment of the system.

As can be seen from the block diagram of FIG. 1, a recommendation engine 1 and a pruning component PRC can form parts of a system used to configure an engineering project such as an automated system. The automated system can comprise a plurality of hardware and/or software modules.

The recommendation engine 1 as illustrated in FIG. 1 comprises in the illustrated embodiment a first artificial intelligence component 1A and a second artificial intelligence component 1B. The first artificial intelligence component 1A is adapted to provide latent representations of initial items $I_1$, $I_2$, $I_3$ of an initial sequence. While the initial sequence represents a partially configured engineering project, the initial items $I_1$, $I_2$, $I_3$ forming the initial sequence each represent a hardware module and/or software module of the engineering project. For example, the latent representation of each initial item $I_1$, $I_2$, $I_3$ is calculated as a vector v for the different properties of the associated module.

The second artificial intelligence component 1B is adapted to process the latent representations of the initial items $I_1$, $I_2$, $I_3$ to generate recommendations R, with each recommendation R being a sequence of complementary items that completes the engineering project when combined with the initial sequence. The recommendations R can be output via an interface 1C and be used, for example, to complete the engineering project.

In the embodiment illustrated in FIG. 1, the illustrated configuration system comprises a memory 2 connected to a user interface 3. The user interface 3 can be integrated in a user terminal or in a mobile user device. The initial sequence is stored at least temporarily in the memory 2 as shown in FIG. 1. The recommendation engine 1 has access to the memory 2 of the configuration system shown in FIG. 1.

In the illustrated embodiment of FIG. 1, the initial items $I_1$, $I_2$, $I_3$ are selected one after the other at times $t_1$, $t_2$, $t_3$ by the user U by means of the user interface 3. Accordingly, in this example, the initial items $I_1$, $I_2$, $I_3$ form the initial sequence of item $I_1$ followed by item $I_2$ followed by item $I_3$. Each item I corresponds to a module of the engineering project, for example a hardware module such as a controller or a display panel, and can comprise one or more item properties. For instance, a controller may comprise as technical properties a supply voltage, a fail-safe compatibility, or its power consumption. A display panel may comprise as technical properties a supply voltage and the resolution of its screen.

In a possible embodiment, the recommendation engine 1 has access to a database 4 storing item properties of different items. Further, the recommendation engine 1 can have access to a further database 5 where a plurality of completed sequences of items are stored.

The first artificial intelligence component 1A of the recommendation engine 1 can comprise in a possible embodiment a trained feature learning component adapted to calculate the latent representations of the initial items $I_1$, $I_2$, $I_3$ stored in a selection basket of the memory 2 as shown in FIG. 1. Further, the second artificial intelligence component 1B of the recommendation engine 1 can comprise a trained sequential model adapted to calculate sequences of complementary items as recommendations R, wherein each sequence of complementary items completes the engineering project when combined with the initial sequence. These recommendations R can be output via the data interface 1C of the recommendation engine 1 to the user interface 3 of the user U. Alternatively, the recommendations R can be filtered by a pruning component PRC before they are displayed on the user interface 3.

In a possible embodiment, the second artificial intelligence component 1B acts as a sequential recommender system and implements a sequence-to-sequence model, for example a recurrent neural network or a transformer, that processes the initial sequence. While the output of the second artificial intelligence component 1B are multiple sequences that can potentially complete the current partial engineering solution, the second artificial intelligence component 1B can be trained to assign a plausibility score to each recommendation R, indicating the plausibility of the respective sequence. As a result, each recommendation R can contain a plausibility score for the respective recommendation R.

In a possible embodiment, the initial items $I_1$, $I_2$, $I_3$ are selected by the user U via the user interface 3 having a screen adapted to output available items to the user. In addition, items contained in the recommendations R can be displayed on the screen of the user interface 3 for selection by the user U. Further, it is possible that the user U selects one or more items I which do not appear one after the other from one of the recommendations R.

The first artificial intelligence component 1A as well as the second artificial intelligence component 1B can comprise artificial neural networks trained on technical properties of modules of the engineering system and trained on a plurality of sequences of previously selected items. In a possible embodiment, the first artificial intelligence component 1A can comprise a trained autoencoder. In an alternative embodiment, the first artificial intelligence component 1A comprises a tensor factorization model. In a preferred embodiment, the second artificial intelligence component 1B comprises a trained recurrent neural network RNN. The recurrent neural network RNN is designed to exploit the temporal dependencies between the items within the engineering project. Further artificial neural networks can also be used for the second artificial intelligence component 1B. In a possible embodiment, the second artificial intelligence component 1B comprises a trained convolutional neural network.

The pruning component PRC contains a feature predictor component FPC implementing an algorithm that predicts technical features of each recommended engineering solution, in other words technical features of each possible completion of the engineering project as represented by the respective recommendation R.

The feature predictor component FPC may be implemented as a rule-based system (e.g., if all modules are fail-safe, then the whole solution has the feature "failsafe"; or fitness to operate under certain environmental conditions based on the properties of the modules, etc.) and/or based on at least one simulation module that computes KPIs such as energy efficiency or performance measures of the engineering solution as represented by the respective recommendation R.

The pruning component PRC further contains a bisection component BC implementing a solution space bisection algorithm, which is a heuristic that selects one of the features computed by the feature predictor component FPC. Intuitively speaking, the goal of the bisection component BC is to select a feature that allows to split a given set of solutions, here the recommendations R, into two sets of approximately same size. An alternative objective is to find a partition where the additive plausibility scores of the solutions, here the recommendations R, in the two disjoint sets are approximately equal. A suitable choice is—similar to a decision tree—selecting a feature that maximizes the Gini index, defined as $$\text{Gini index} = p_f(1 - p_f),$$

where $p_f$ is the proportion of solutions (recommendations R) that has a feature f.

The system as illustrated in FIG. 1 comprises a recommendation engine 1 and a pruning component PRC which can be used for completing a partially configured engineering project. The recommendation engine 1 and the pruning component PRC reduce the time required for completing the configuration of the engineering project. The recommendation engine 1 exploits the sequential nature of the configuration process of an industrial automation solution. It can also exploit the complex relationships between the underlying modules for generating project completion suggestions or recommendations. The information about the order in which modules have been introduced as items into the recommendation system 1 comprise contextual information for completing the respective engineering project based on historical examples of previously configured engineering projects for which the same information is available. Introducing technical information about the modules can additionally ensure their compatibility. Further, the information can be used as the basis for recommendation when there is not enough historical data available. The recommendation engine 1 and the pruning component PRC can be used to provide automatic project completion, i.e., they can provide a sequence of items associated with modules that remain to be added in order to fulfill all functional requirements of the engineering project. An automation mechanism can be installed for auto-completion of the partially configured engineering project.

The system shown in FIG. 1 can employ the temporal dependencies between selected items associated with the modules of the engineering project. After automatically completing the engineering project by combining the initial sequence with the chosen pruned recommendation as will be described in more detail below, the resulting sequence can be used to update a content of the database 5 comprising the plurality of historical completed item sequences. Consequently, the performance of the system can improve over time with the increasing number of completed projects. The system can be used by one or more users U.

Figure 2:
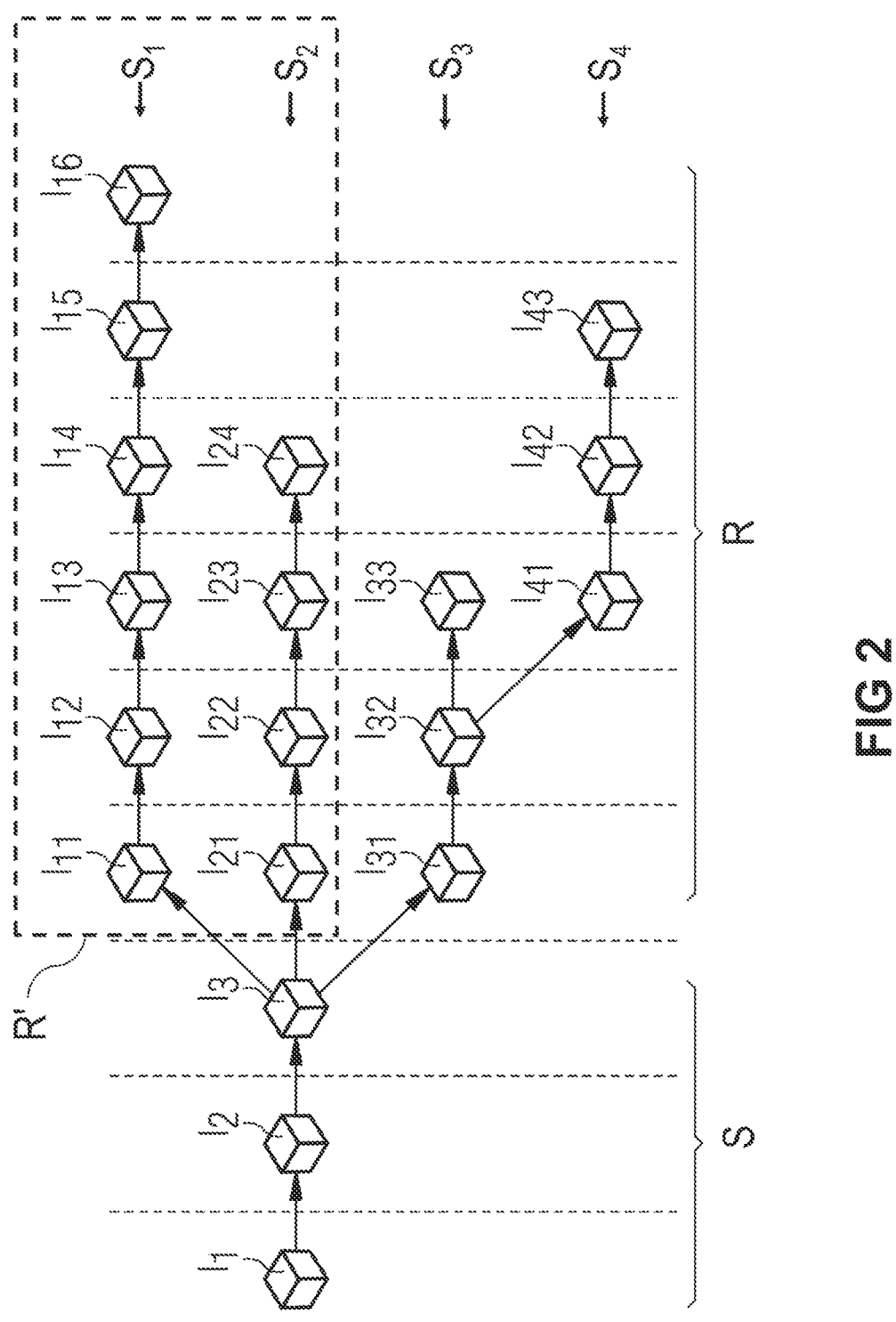
FIG. 2 shows schematically possible sequences of complementary items output as recommendations R to a user by a system as illustrated in FIG. 1.

FIG. 2 shows an example illustrating the operation of the recommendation engine 1 that was described with regard to FIG. 1. In the example, the user U has performed a partial configuration of an engineering project such as an automated system by selecting consecutively three initial items $I_1$, $I_2$, $I_3$ from available items, resulting in a partially configured engineering project represented by an initial sequence $S = [I_1, I_2, I_3]$. Each item I corresponds to an associated module usable in the engineering project. The partially configured engineering project, i.e., the initial sequence of the initial items $I_1$, $I_2$, $I_3$ can be stored in the memory 2 of the recommendation system illustrated in FIG. 1.

In order to produce the initial sequence S, the user can start to configure an engineering project, for example an automation solution, from a blank state corresponding to an empty shopping basket or empty sequence (i.e., no items I have been selected so far). The user then iteratively selects items (i.e., adds modules to the partially configured engineering project) that build the initial sequence $S = [I_1, I_2, I_3]$.

In a possible embodiment, after each initial item $I_1$, $I_2$, $I_3$ is selected, sequences that can complete the current partially configured engineering project are recommended to the user as recommendations R in the way that was described with regard to FIG. 1, in order to help the user in arriving at the initial sequence S. The user may select one or several items from the recommendations R that are presented to him, or by browsing catalogues of items for manual selection. The selection of a single item from one of the recommendations R can be performed by clicking on the displayed item. This process is described in more detail in WO 2021037603 A1.

For the next section, we assume that the user and/or the system have arrived at the initial sequence $S = [I_1, I_2, I_3]$, and that the engineering process is now, at least theoretically, ready for completion, given the right recommendation. In other words, the initial sequence S might already contain dozens, hundreds, or many thousands of items, and the engineering process might have taken a considerable amount of time in order to reach this point.

In order to automatically produce the recommendations R for the initial sequence $S=[I_1, I_2, I_3]$, the initial items $I_1$, $I_2$, $I_3$ are first applied to the first artificial intelligence component 1A of the recommendation engine 1. The first artificial intelligence component 1A is adapted to provide latent representations of initial items $I_1$, $I_2$, $I_3$. For example, the latent representations are calculated automatically by the first artificial intelligence component 1A based on previous training.

The second artificial intelligence component 1B processes the latent representations of the initial items $I_1$, $I_2$, $I_3$ to calculate recommendations R, with each recommendation R being a sequence of complementary items that completes the engineering project when combined with the initial sequence S.

In the illustrated example of FIG. 2, the second artificial intelligence component 1B generates different sequences of complementary items $S_1$, $S_2$, $S_3$, $S_4$ as recommendations R to complete the engineering project. These different sequences of complementary items $S_1$, $S_2$, $S_3$, $S_4$ form different completion scenarios which can be directly output as recommendations R to the user U or processed by the pruning component PRC in order to form pruned recommendations R'.

A first sequence of complementary items $S_1$ comprises in the illustrated example of FIG. 2 items $I_{11}$, $I_{12}$, $I_{13}$, $I_{14}$, $I_{15}$, $I_{16}$. Accordingly, the first sequence of complementary items $S_1$ comprises six items $I_{11}$ to $I_{16}$ which could be selected by the user U in order to complete the partially configured engineering project represented by the initial sequence S. A second sequence of complementary items $S_2$ comprises items $I_{21}$, $I_{22}$, $I_{23}$, $I_{24}$. A third sequence of complementary items $S_3$ comprises in the illustrated example items $I_{31}$, $I_{32}$, $I_{33}$. A fourth sequence of complementary items $S_4$ comprises in the illustrated example items $I_{41}$, $I_{42}$, $I_{43}$.

Accordingly, after having selected the third item $I_3$ at time $t_3$ to provide a partial configuration of the engineering project as represented by the initial sequence S, on request the four different sequences of complementary items $S_1$, $S_2$, $S_3$, $S_4$ can be output via the user interface 3 to the user U as the recommendations R to complete the partially configured engineering project. The sequences of complementary items $S_1$, $S_2$, $S_3$, $S_4$ are displayed to the user U sorted by their plausibility scores as calculated by the second artificial intelligence component 1B.

The user U could now directly choose one of the sequences of complementary items $S_1$, $S_2$, $S_3$, $S_4$ in order to finalize the whole engineering project. To this end, several or all of the recommendations R generated by the second artificial intelligence component 1B can be displayed on a screen of the user interface 3 for the selection by the user U. The user U may use a selection command (e.g., clicking) to select one of the sequences of complementary items $S_1$, $S_2$, $S_3$, $S_4$. For example, the user U may select the first sequence of complementary items $S_1$ as a whole to select automatically all remaining complementary items $I_{11}$ to item $I_{16}$ to complete the configuration of the engineering project. Alternatively, the user U may select the second sequence of complementary items $S_2$ including four items $I_{21}$, $I_{22}$, $I_{23}$, $I_{24}$, or the third sequence of complementary items $S_3$ including items $I_{31}$, $I_{32}$, $I_{33}$, or the fourth sequence of complementary items $S_4$ including items $I_{41}$, $I_{42}$, $I_{43}$ to complete the engineering project.

However, as was described with regard to FIG. 1, the pruning component PRC is used to filter the recommendations R before or after output to the user U, in order to simplify his choice. To this end, the feature predictor component FPC shown in FIG. 1 computes a set of features for each sequence of complementary items $S_1$, $S_2$, $S_3$, $S_4$. In the example shown in FIG. 2, the feature predictor component FPC computes that the first sequence of complementary items $S_1$ and the second sequence of complementary items $S_2$ each have the features "failsafe" and "fit for extended environment conditions", while the third sequence of complementary items $S_3$ has the features "not failsafe" and "fit for extended environment conditions", and the fourth sequence of complementary items $S_4$ has the features "not failsafe" and "not fit for extended environment conditions". Of course, many more features could be computed by the feature predictor component FPC.

The bisection component BC shown in FIG. 1 then selects a feature from the computed sets of features that distinguishes some of the sequences of complementary items $S_1$, $S_2$, $S_3$, $S_4$. The bisection component BC selects a feature that approximately cuts the recommendations R in half (e.g., the feature that has the largest Gini index). In the given example, the bisection component BC computes the Gini index of the two features: 0.25 for "failsafe" and 0.22 for "fit for extended environment conditions".

The selected feature is displayed on the user interface 3, for example in the form of a question such as "Do you require a fail-safe solution?" for the feature "failsafe" or "Do you require a solution that can operate under extended environmental conditions?" for the feature "fit for extended environment conditions". Since computed the Gini index for the feature "failsafe" his higher, the user is asked whether the feature "failsafe" is required, and we assume that he confirms the respective requirement. As a result, the user interface 3 detects a user interaction indicating that the selected feature is required. The system then forms pruned recommendations R' by choosing all instances from the recommendations R that have the selected feature. In other words, the recommendations R are filtered with respect to the preference/requirement specified by the user. The user interface 3 then outputs the pruned recommendations R' and detects a user interaction choosing one of the pruned recommendations R'. The chosen pruned recommendation is then used for automatically completing the engineering project by combining the initial sequence S with the chosen pruned recommendation. The completed engineering project can be output on the user interface, stored in the memory 2, or exported.

In other words, the user is presented with a question that queries information (such as importance of KPIs, technical features, etc.) about the desired completed solution. If the user answers this question, the provided information is used to prune the set of recommendations R, thus adjusting the suggestions according to the stated preferences. This interactive workflow provided by the system supports the user during the configuration process.

In a possible variant, the recommendations R can be displayed on the user interface 3 when asking whether the selected feature is required. The corresponding visualization can distinguish the pruned recommendations R' that have the selected feature. This can help the user to understand in what ways the recommendations R are conflicting in certain situations, and also help the user to intuitively understand the operation of the underlying machine learning model implemented in the second artificial intelligence component.

After the selection of one of the pruned recommendations R', the user U may in a possible implementation acknowledge the selection to trigger an automatic ordering process of the associated modules. For example, after having selected the second sequence of complementary items S2 including items I21, I22, I23, I24, the system can ask the user U whether he wants to finalize the engineering project and to trigger an automatic ordering of the physical modules (hardware and/or software modules) associated with the selected items I21, I22, I23, I24 of the selected second sequence of complementary items $S_2$. Accordingly, the selecting of a whole sequence of complementary items by the user U via the user interface 3 can trigger in a possible implementation automatically an ordering command to order the associated modules for completion of the engineering project.

Figure 3:
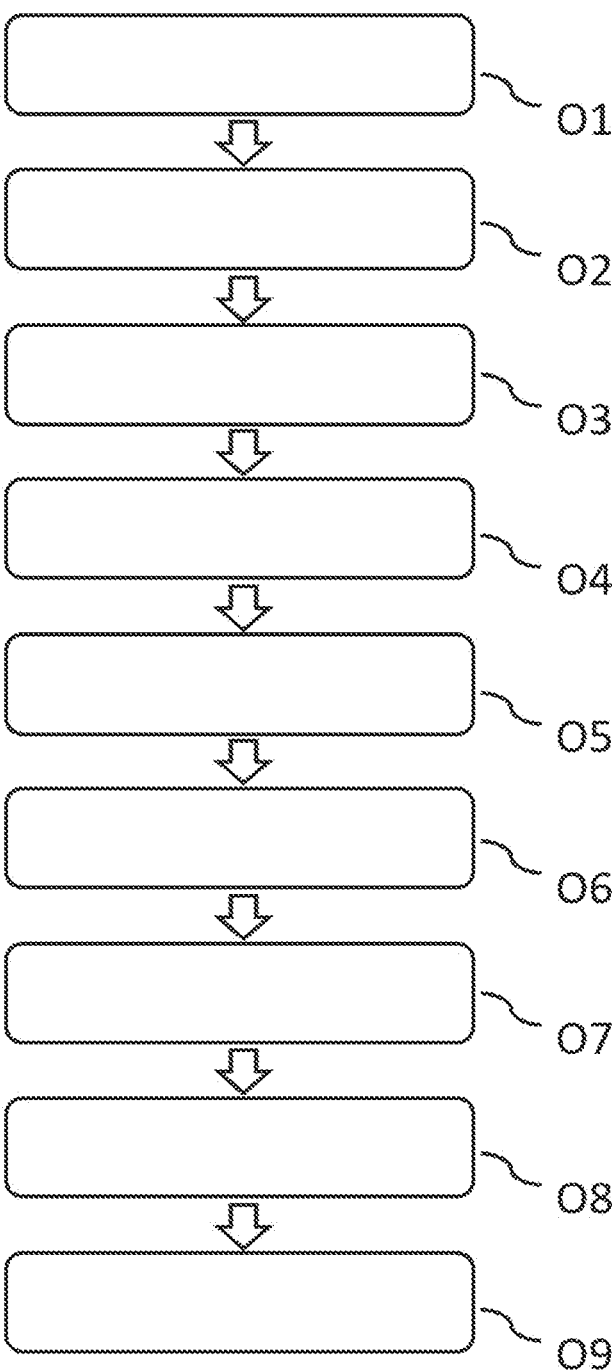
FIG. 3 shows a flowchart of a possible exemplary embodiment of the method.

FIG. 3 shows a flowchart of a possible exemplary embodiment of the method. In the illustrated embodiment, the method is used for semi-automatic completion of an engineering project, for example a printed circuit board, an autonomous vehicle or an industrial automation solution comprising a plurality of hardware and/or software modules. In the illustrated embodiment, the method comprises nine main operations that are performed by components, wherein the components are software components executed by one or more processors and/or hardware components.

In a first operation O1, a first artificial intelligence component calculates latent representations of initial items of an initial sequence, with the initial sequence representing a partially configured engineering project, and with the initial items representing hardware modules and/or software modules used in the engineering project. The first artificial intelligence component 1A calculates for each initial item a latent representation which comprises a vector v for the different properties of the associated module.

In a second operation O2, a second artificial intelligence component processes the latent representations to generate recommendations, with each recommendation being a sequence of complementary items that completes the engineering project when combined with the initial sequence.

In a third operation O3, a feature predictor component computes a set of features for each recommendation.

In a fourth operation O4, a bisection component selects a feature from the sets of features that distinguishes some of the recommendations.

In a fifth operation O5, the selected feature is displayed by a user interface. The user interface then detects a user interaction indicating that the selected feature is required.

In a sixth operation O6, pruned recommendations are formed by choosing all instances from the recommendations that have the selected feature. The pruned recommendations can also be formed beforehand, for example by the bisection component.

In a seventh operation O7, the user interface outputs the pruned recommendations and detects a user interaction choosing one of the pruned recommendations.

In an eighth operation O8, the engineering project is automatically completed by combining the initial sequence with the chosen pruned recommendation.

In a ninth operation, O9, the completed engineering project is outputted, for example on a display of the user interface, and/or stored, for example on a hard disk. If the completed engineering project is, for example, a printed circuit board, it can be produced automatically at this point.

The embodiment of the method as illustrated in the flowchart of FIG. 3 can be implemented in a software tool comprising a program code executable to perform the steps illustrated in FIG. 3.

The system as illustrated in FIG. 1 can be implemented in a possible embodiment as a desktop solution. In this embodiment, the computer-implemented method can be executed by a processor of a user terminal. In an alternative embodiment, the recommendation engine 1 can also be implemented on a web server of a cloud platform connected via a data network to a plurality of different user terminals. In this embodiment, the computer-implemented method can be executed by one or more processors of a server of the cloud platform.

The method and system can be used for a wide range of different application and use cases and are not restricted to the embodiments illustrated in FIGS. 1 and 2. The method and system can be used for any complex system which requires configuration of its functional modules. The method can be implemented in software tools such as TIA Selection Tool, TIA Portal or NX Designer. Embodiments of the invention provide a sequential recommendation system for completion of any kind of complex engineering projects.

For example, the method can be executed by one or more processors. Each processor can be a microcontroller or a microprocessor, an Application Specific Integrated Circuit (ASIC), a neuromorphic microchip, in particular a neuromorphic processor unit. The processor can be part of any kind of computer, including mobile computing devices such as tablet computers, smartphones or laptops, or part of a server in a control room or cloud. For example, a processor, controller, or integrated circuit of the computer system and/or another processor may be configured to implement the acts described herein.

The above-described method may be implemented via a computer program product including one or more computer-readable storage media having stored thereon instructions executable by one or more processors of a computing system. Execution of the instructions causes the computing system to perform operations corresponding with the acts of the method described above.

The instructions for implementing processes or methods described herein may be provided on non-transitory computer-readable storage media or memories, such as a cache, buffer, RAM, FLASH, removable media, hard drive, or other computer readable storage media. Computer readable storage media include various types of volatile and non-volatile storage media. The functions, acts, or tasks illustrated in the figures or described herein may be executed in response to one or more sets of instructions stored in or on computer readable storage media. The functions, acts or tasks may be independent of the particular type of instruction set, storage media, processor or processing strategy and may be performed by software, hardware, integrated circuits, firmware, micro code and the like, operating alone or in combination. Likewise, processing strategies may include multiprocessing, multitasking, parallel processing and the like.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A method for semi-automatic completion of an engineering project, comprising the following operations performed by components, wherein the components are software components executed by one or more processors and/or hardware components:

calculating, by a first artificial intelligence component of
  a recommendation engine comprising one or more processors, latent representations of initial items of an initial sequence, with the initial sequence representing a partially configured engineering project, with the initial items representing hardware modules and/or software modules used in the engineering project, wherein the first artificial intelligence component comprises a trained feature learning component adapted to calculate the latent representations of the initial items, and is trained on item properties stored in a first database storing the item properties of a plurality of different items, the first database accessible by the recommendation engine;

encoding, by the first artificial intelligence component, technical information of the hardware and/or software modules into the latent representations;

processing, by a second artificial intelligence component of the recommendation engine, the latent representations to generate recommendations, with each recommendation being a sequence of complementary items that completes the engineering project when combined with the initial sequence, wherein the second artificial intelligence component comprises a trained sequential model adapted to calculate the sequence of complementary items as the recommendations, and is trained on historically completed item sequences stored in a second database storing the historical completed item sequences, the second database accessible by the recommendation engine;

computing, by a feature predictor component, a set of features for each recommendation, wherein the feature predictor component predicts technical features of each recommendation generated by the second artificial intelligence component;

selecting, by a bisection component, a feature from the sets of features that distinguishes some of the recommendations;

displaying, by a user interface, the selected feature, and detecting, by the user interface, a user interaction indicating that the selected feature is required;

forming pruned recommendations by choosing all instances from the recommendations that have the selected feature;

outputting, by the user interface, the pruned recommendations, and detecting, by the user interface, a user interaction choosing one of the pruned recommendations;

automatically completing the engineering project by combining the initial sequence with the chosen pruned recommendation;

in response to the automatically completing the engineering project, updating the second database with the completed engineering project such that the completed engineering project is used as additional training of the second artificial intelligence component so that the second artificial intelligence component improves over time as a function of the updating;

outputting and/or storing the completed engineering project; and automatically producing the engineering project according to the completed project.

2. The method according to claim 1, wherein:

the second artificial intelligence component has been trained to assign a plausibility score to each recommendation, indicating the plausibility of the respective sequence of complementary items, and

the pruned recommendations are sorted in the outputting operation according to their plausibility score on a display of the user interface.

3. The method according to claim 1, wherein:

the feature predictor component includes a rule-based system, and/or the feature predictor component includes at least one simulation module that computes at least some of the features, and/or at least some of the features are key performance indicators including energy efficiency measures and/or performance measures.

4. The method according to claim 1, wherein the bisection component is adapted to select a feature that distinguishes approximately half of the recommendations by choosing a feature that maximizes a Gini index.

5. The method according to claim 1, wherein the second artificial intelligence component is implemented as a sequence-to-sequence model, and wherein the sequence-to-sequence model processes the input sequence.

6. The method according to claim 1, wherein the latent representations encode technical information about the hardware modules and/or software modules.

7. The method according to claim 1, wherein the pruned recommendations are distinguished from the recommendations in a corresponding visualization that shows at least one way the recommendations are conflicting.

8. The method according to claim 1, wherein each latent representation comprises a vector for different technical properties of the associated module, wherein the technical properties include supply voltage, fail-safe compatibility, power consumption, and screen resolution.

9. A system for semi-automatic completion of an engineering project, comprising the following components, wherein the components are software components executed by one or more processors and/or hardware components:

a first artificial intelligence component of a recommendation engine comprising one or more processors, adapted for calculating latent representations of initial items of an initial sequence, with the initial sequence representing a partially configured engineering project, and with the initial items representing hardware modules and/or software modules used in the engineering project, wherein the first artificial intelligence component comprises a trained feature learning component adapted to calculate the latent representations of the initial items, and is trained on item properties stored in a first database storing the item properties of a plurality of different items, the first database accessible by the recommendation engine, wherein the first artificial intelligence component encodes technical information of the hardware and/or software modules into the latent representations;

a second artificial intelligence component of the recommendation engine, adapted for processing the latent representations to generate recommendations, with each recommendation being a sequence of complementary items that completes the engineering project when combined with the initial sequence, wherein the second artificial intelligence component comprises a trained sequential model adapted to calculate the sequence of complementary items as the recommendations, and is trained on historically completed item sequences stored in a second database storing the historical completed item sequences, the second database accessible by the recommendation engine;

a feature predictor component, adapted for computing a set of features for each recommendation, wherein the feature predictor component predicts technical features of each recommendation generated by the second artificial intelligence component;

a bisection component, adapted for selecting a feature from the sets of features that distinguishes some of the recommendations and for forming pruned recommendations by choosing all instances from the recommendations that have the selected feature;

a user interface, adapted for:

displaying the selected feature and detecting a user interaction indicating that the selected feature is required, outputting the pruned recommendations and detecting a user interaction choosing one of the pruned recommendations; and at least one hardware and/or software component, adapted for automatically completing the engineering project by combining the initial sequence with the chosen pruned recommendation, outputting and/or storing the completed engineering project, and, in response to the automatically completing the engineering project, updating the second database with the completed engineering project such that the completed engineering project is used as additional training of the second artificial intelligence component so that the second artificial intelligence component improves over time as a function of the updating.

10. A computer program product, comprising a computer readable hardware storage device having computer readable program code stored therein, said program code executable by a processor of a computer system to implement a method comprising:

calculating, by a first artificial intelligence component of a recommendation engine comprising one or more processors, latent representations of initial items of an initial sequence, with the initial sequence representing a partially configured engineering project, and with the initial items representing hardware modules and/or software modules used in a engineering project;

encoding, by the first artificial intelligence component, technical information of the hardware and/or software modules into the latent representations;

processing, by a second artificial intelligence component of the recommendation engine, the latent representations to generate recommendations, with each recommendation being a sequence of complementary items that completes the engineering project when combined with the initial sequence, wherein the first artificial intelligence component comprises a trained feature learning component adapted to calculate the latent representations of the initial items, and is trained on item properties stored in a first database storing the item properties of a plurality of different items;

computing, by a feature predictor component, a set of features for each recommendation, wherein the feature predictor component predicts technical features of each recommendation generated by the second artificial intelligence component, wherein the second artificial intelligence component comprises a trained sequential model adapted to calculate the sequence of complementary items as the recommendations, and is trained on historically completed item sequences stored in a second database storing the historical completed item sequences;

selecting, by a bisection component, a feature from the sets of features that distinguishes some of the recommendations;

displaying, by a user interface, the selected feature, and detecting, by the user interface, a user interaction indicating that the selected feature is required;

forming pruned recommendations by choosing all instances from the recommendations that have the selected feature;

outputting, by the user interface, the pruned recommendations, and detecting, by the user interface, a user interaction choosing one of the pruned recommendations;

automatically completing the engineering project by combining the initial sequence with the chosen pruned recommendation;

in response to the automatically completing the engineering project, updating the second database with the completed engineering project such that the completed engineering project is used as additional training of the second artificial intelligence component so that the second artificial intelligence component improves over time as a function of the updating; and outputting and/or storing the completed engineering project.

\* \* \* \* \*